US007895494B2

(12) United States Patent
Terry et al.

(10) Patent No.: US 7,895,494 B2
(45) Date of Patent: Feb. 22, 2011

(54) METHOD AND SYSTEM FOR IMPLEMENTING H-ARQ-ASSISTED ARQ OPERATION

(75) Inventors: Stephen E. Terry, Northport, NY (US); Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1005 days.

(21) Appl. No.: 11/614,764

(22) Filed: Dec. 21, 2006

(65) Prior Publication Data

US 2007/0168826 A1 Jul. 19, 2007

Related U.S. Application Data

(60) Provisional application No. 60/754,713, filed on Dec. 29, 2005.

(51) Int. Cl.
*H04L 1/18* (2006.01)
*G08C 25/02* (2006.01)

(52) U.S. Cl. .................................................... 714/748
(58) Field of Classification Search .......... 714/748–749; 370/428, 473, 743
See application file for complete search history.

(56) References Cited

U.S. PATENT DOCUMENTS

| 7,185,257 B2 | 2/2007 | Kim et al. |
| 7,447,968 B2 | 11/2008 | Ha et al. |

| 2007/0177630 A1* | 8/2007 | Ranta et al. ............... 370/473 |

FOREIGN PATENT DOCUMENTS

| CA | 2651271 A1 | 3/2003 |
| EP | 1 337 065 | 8/2003 |
| EP | 1337065 A1 | 8/2003 |
| EP | 1 770 897 | 4/2007 |
| RU | 2236091 C2 | 9/2004 |
| RU | 2267225 C2 | 12/2005 |
| WO | 03/096567 | 11/2003 |
| WO | WO 03/096567 A1 | 11/2003 |

OTHER PUBLICATIONS

Herrmann et al., *Improving Packet Loss Probability in the UMTS High-Speed Downlink*, Vehicular Technology Conference, pp. 2655-2659, (Oct. 6, 2003).
Samsung, *HARQ Assisted ARQ Operation*, 3GPP TSG-RAN2 Meeting #49, R2-052800, (Seoul, Korea Nov. 7-11, 2005).

* cited by examiner

*Primary Examiner*—Shelly A Chase
(74) *Attorney, Agent, or Firm*—Woodcock Washburn LLP

(57) ABSTRACT

A method and system for implementing hybrid automatic repeat request (H-ARQ)-assisted automatic repeat request (ARQ) in a wireless communication system are disclosed. When an H-ARQ negative acknowledgement (NACK)-to-positive acknowledgement (ACK) error occurs, the H-ARQ receiver sends an H-ARQ NACK-to-ACK error indicator to the H-ARQ transmitter unless a maximum retransmission limit has reached, a maximum time for delivery has expired or a lifespan of the failed packet has expired. The H-ARQ transmitter sends a local NACK to the ARQ transmitter so that the failed packet is recovered at an ARQ level. The H-ARQ receiver sends a local NACK to the ARQ receiver if the H-ARQ receiver does not receive the failed packet before certain conditions occur. The ARQ receiver may send a status report to the ARQ transmitter for recovery of the failed packet.

44 Claims, 3 Drawing Sheets

METHOD AND SYSTEM FOR IMPLEMENTING H-ARQ-ASSISTED ARQ OPERATION

CROSS REFERENCE TO RELATED APPLICATION

This application claims the benefit of U.S. Provisional Application No. 60/754,713 filed Dec. 29, 2005, which is incorporated by reference as if fully set forth.

FIELD OF INVENTION

The present invention is related to wireless communication systems. More particularly, the present invention is related to a method and system for implementing hybrid automatic repeat request (H-ARQ)-assisted automatic repeat request (ARQ) in a wireless communication system.

BACKGROUND

In conventional wireless communication systems, such as wideband code division multiple access (WCDMA) Release 5/6, high speed data transmission is achieved by high speed downlink packet access (HSDPA) and high speed uplink packet access (HSUPA) technologies. To improve reliability of data transmission, H-ARQ and ARQ are implemented.

FIG. 1 shows a conventional wireless communication system 100. The system 100 includes a user equipment (UE) 110, a Node-B 120 and a radio network controller (RNC) 130. H-ARQ entities are located in a medium access control (MAC) layer 112 of the UE 110 and a MAC layer 122 of the Node-B 120. Packets are assigned transmission sequence numbers (TSNs) in an H-ARQ transmitter. An H-ARQ receiver receives the packets and attempts to decode the transmitted packets. If a packet is not decodable, the H-ARQ receiver sends a negative acknowledgment (NACK) back to the H-ARQ transmitter for retransmission of the failed packet. If a packet is correctly decoded, the H-ARQ receiver sends a positive acknowledgment (ACK) for the packet to the H-ARQ transmitter. Upon receiving a NACK, the H-ARQ transmitter retransmits the packet if the number of retransmissions of the failed packet is less than a predetermined maximum limit, and the allowed transmission time for the failed packet has not expired. Otherwise, the failed packet is discarded and recovered at an ARQ level.

ARQ entities are located in a radio link control (RLC) layer 114 of the UE 110 and an RLC layer 132 of the RNC 130. The ARQ entities handle the retransmission of the failed packet. The ARQ entities recover packets that are lost due to an NACK-to-ACK misinterpretation error at the H-ARQ level. The ARQ process in an RLC layer is quite complex with many options to perform status reporting.

An H-ARQ assisted ARQ operation may be considered when both the H-ARQ and ARQ functions are co-located, such as in a universal mobile telecommunication systems (UMTS) Node-B or a long term evolution (LTE) evolved Node-B (eNode-B).

FIG. 2 shows an example of an H-ARQ-assisted ARQ operation proposed for third generation partnership project (3GPP) standards. A transmitter 250 includes an ARQ transmitter 252 and an H-ARQ transmitter 254. A receiver 260 includes an ARQ receiver 262 and an H-ARQ receiver 264. The H-ARQ transmitter 254 provides a local ACK or a local NACK to the ARQ transmitter 252.

As shown in FIG. 2, a local NACK is generated when the H-ARQ transmitter 254 fails the H-ARQ transmission, (e.g., due to maximum retransmission limit). The ARQ transmitter 252 sends an ARQ protocol data unit (PDU) x to the H-ARQ transmitter 254 (step 202). The H-ARQ transmitter 254 sends the ARQ PDU x to the H-ARQ receiver 264 (step 204). The ARQ PDU x is not decodable and the H-ARQ receiver 264 sends a NACK to the H-ARQ transmitter 254 (step 206). The H-ARQ transmitter 254 retransmits the ARQ PDU x to the H-ARQ receiver 264 (step 208). The ARQ PDU x is still not decodable and the H-ARQ receiver 264 sends another NACK to the H-ARQ transmitter 254 (step 210). At such a point, it is determined that the number of retransmissions for the ARQ PDU x reaches a maximum retransmission limit (step 212). The H-ARQ transmitter 254 then sends a local NACK for the ARQ PDU x to the ARQ transmitter 252 (step 214).

A local NACK may also be generated when an NACK-to-ACK error is reported from the H-ARQ receiver 264 to the H-ARQ transmitter 254. Still referring to FIG. 2, the ARQ transmitter 252 sends an ARQ PDU y to the H-ARQ transmitter 254 (step 216). The H-ARQ transmitter 254 transmits the ARQ PDU y to the H-ARQ receiver 264 (step 218). The ARQ PDU y is not decodable and the H-ARQ receiver 264 sends a NACK to the H-ARQ transmitter 254 (step 220). However, the NACK is misinterpreted as an ACK by the H-ARQ transmitter 254 and the H-ARQ transmitter 254 treats the ARQ PCU y as successfully transmitted. The H-ARQ receiver 264 detects an NACK-to-ACK error, (e.g., when the H-ARQ receiver 264 receives a new PDU via the same H-ARQ process while waiting for retransmission of the ARQ PDU y), (step 222). The H-ARQ receiver 264 sends a NACK-to-ACK error indicator to the H-ARQ transmitter 254 (step 224). Upon receipt of the NACK-to-ACK error indicator, the H-ARQ transmitter 254 sends a local NACK to the ARQ transmitter 252 and the ARQ PDU y is recovered at an ARQ level (step 226).

As shown in FIG. 2, a local ACK is generated when none of the above two events for an ARQ packet occurs during a predefined time interval. The ARQ transmitter 252 sends an ARQ PDU z to the H-ARQ transmitter 254 (step 228). The H-ARQ transmitter 254 transmits the ARQ PDU z to the H-ARQ receiver 364 (step 230). The ARQ PDU z is successfully decoded and the H-ARQ receiver 264 sends the ARQ PDU z to the ARQ receiver 262 (step 232), and sends an ACK to the H-ARQ transmitter 254 (step 234). When it is determined that a NACK-to-ACK error is not reported during a predetermined time interval (step 236), the H-ARQ transmitter 254 sends a local ACK to the ARQ transmitter 252 (step 238). The ARQ transmitter 252 will discard the packet from a transmit buffer after receiving the local ACK from the H-ARQ transmitter 254.

In the above example of an H-ARQ assisted ARQ system, a complex layer 2 (L2) status reporting mechanism is removed under the assumption that the NACK-to-ACK error is the only significant source of undetected packet loss. The ARQ transmitter will not be able to recover the packet for cases where the NACK-to-ACK error indicator is lost or a shared channel is lost due to a discontinuous transmission (DTX)/ACK error. Thus lossless transmission cannot be guaranteed.

Current downlink H-ARQ, (Release 5), does not specify the maximum number of retransmissions for a packet. Thus, the H-ARQ transmitter or receiver does not know the maximum number of transmissions for each packet. There is an assumption that the ARQ transmitter and the H-ARQ transmitter have the same PDU size. The H-ARQ transmitter informs the ARQ transmitter the segment that is lost, (not the ARQ PDU). If the ARQ PDU is retransmitted, the H-ARQ transmitter will retransmit the complete packet, not only the missing segment. It is also unclear how to recover the last packet of the H-ARQ transmission.

SUMMARY

The present invention is related to a method and system for implementing H-ARQ-assisted ARQ in a wireless communication system. An H-ARQ receiver determines whether an H-ARQ NACK-to-ACK error occurs. When an H-ARQ NACK-to-ACK error occurs, the H-ARQ receiver sends an H-ARQ error indicator to the H-ARQ transmitter unless the number of retransmissions of the failed packet has reached a maximum retransmission limit, a maximum time for delivery of the failed packet has expired and/or a lifespan of the failed packet has expired. The H-ARQ transmitter tries to recover the failed packet. The H-ARQ transmitter sends a local NACK to the ARQ transmitter if the maximum retransmission limit has been reached, the maximum delivery time has expired or the lifespan of the failed packet has expired, so that the failed packet can be recovered at an ARQ level. The H-ARQ receiver sends a local NACK to the ARQ receiver if the H-ARQ receiver does not receive the failed packet before certain conditions occur. Based on reception of the local NAK, the ARQ receiver may send a status report to the ARQ transmitter for recovery of the failed packet.

BRIEF DESCRIPTION OF THE DRAWINGS

A more detailed understanding of the invention may be had from the following description of a preferred embodiment, given by way of example and to be understood in conjunction with the accompanying drawing(s) wherein.

DETAILED DESCRIPTION OF THE PREFERRED EMBODIMENTS

The features of the present invention may be incorporated into an integrated circuit (IC) or be configured in a circuit comprising a multitude of interconnecting components.

Figure 1:
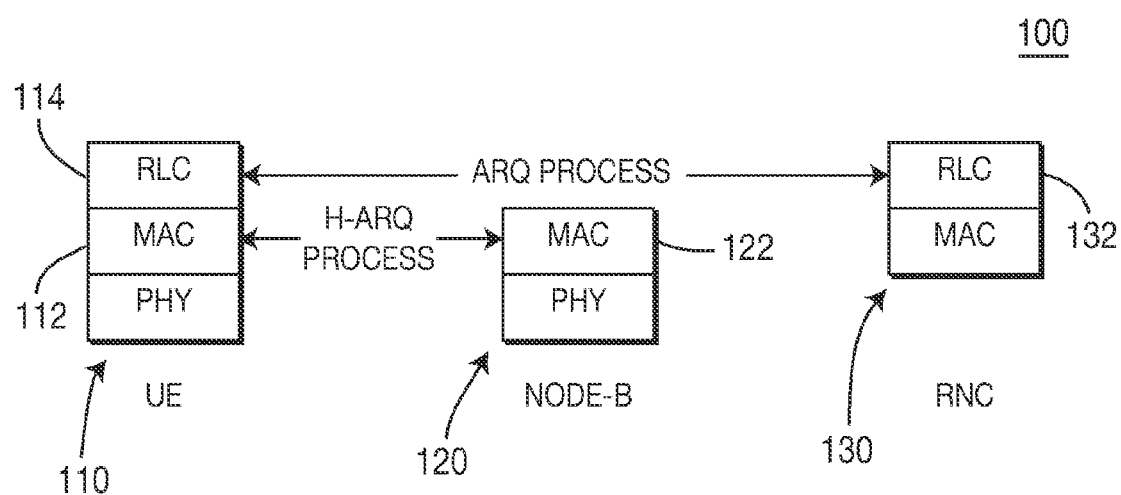
FIG. 1 shows a conventional wireless communication system.
Figure 2:
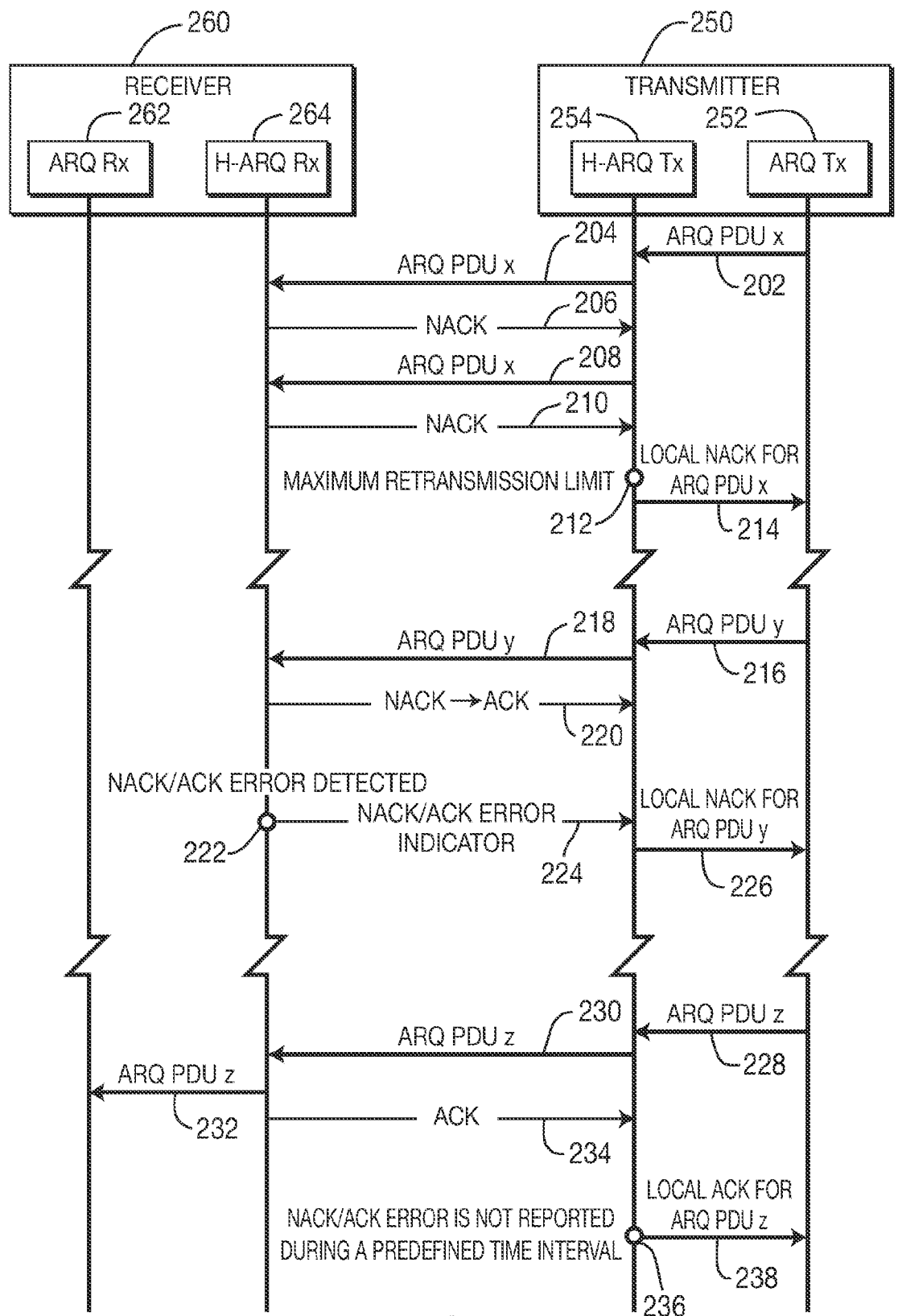
FIG. 2 shows an example of an H-ARQ-assisted ARQ operation proposed for third generation partnership project (3GPP) standards.
Figure 3:
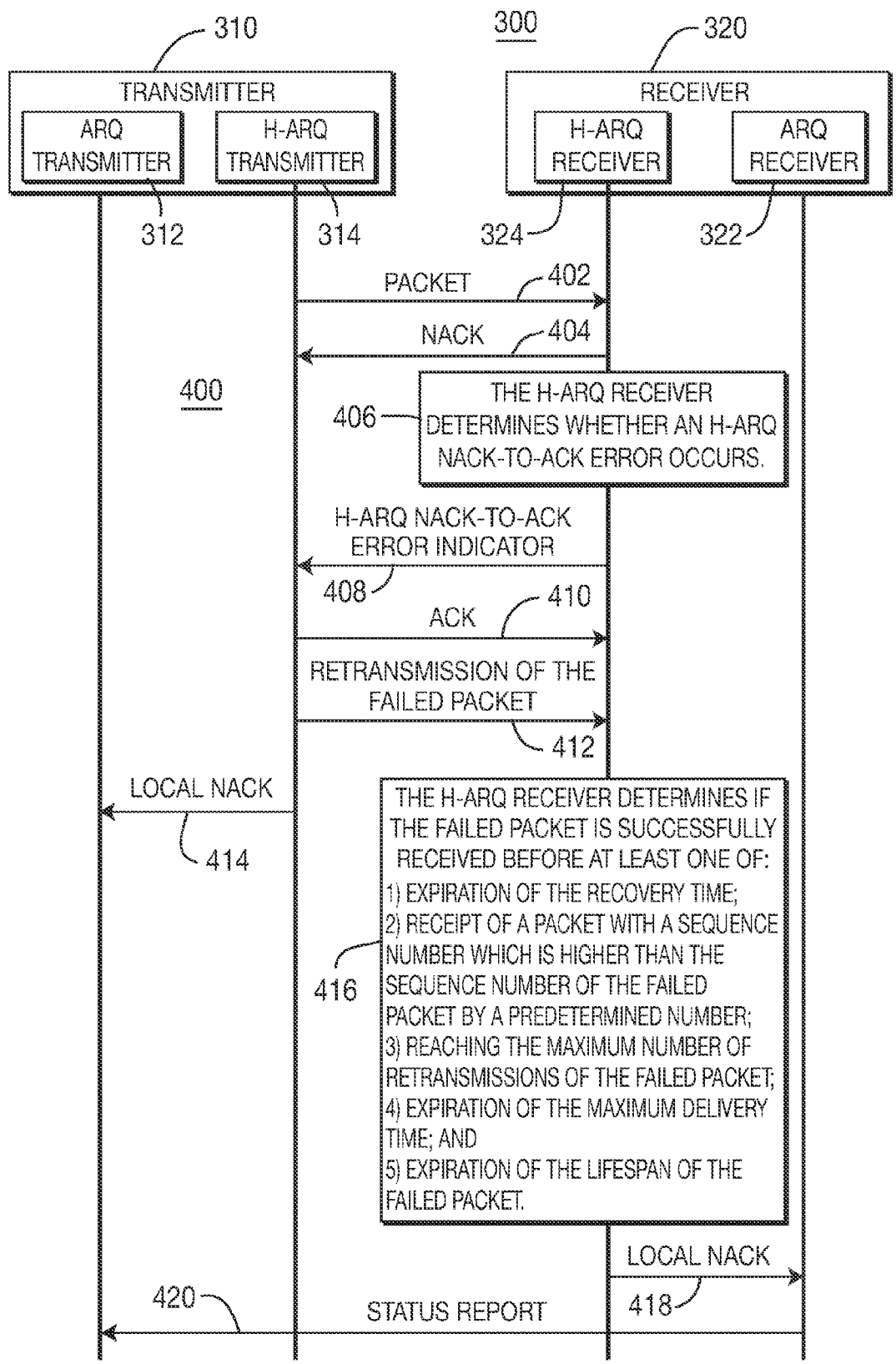
FIG. 3 is a signaling diagram of a process for implementing an H-ARQ-assisted ARQ operation in accordance with the present invention.

FIG. 3 is a signaling diagram of a process 400 for implementing an H-ARQ-assisted ARQ operation in a wireless communication system 300 in accordance with the present invention. The system 300 includes a transmitter 310 and a receiver 320. The transmitter 310 includes an ARQ transmitter 312 and an H-ARQ transmitter 314. The receiver 320 includes an ARQ receiver 322 and an H-ARQ receiver 324.

In order to support the H-ARQ-assisted ARQ in accordance with the present invention, the following parameters are defined:

$T_{ErrorIndicator}$: H-ARQ error indication timer is defined as the amount of time that an H-ARQ receiver should wait for a retransmission of the failed packet before sending an HARQ error indicator. It is preferable to keep the H-ARQ error indication timer constant for the whole system for simple implementation. However, the H-ARQ error indication timer may be adjusted based on the quality of service (QoS) requirements. For example, the length of the H-ARQ error indication timer may be linked to the scheduling priority.

$N_{Retransmission}$: Maximum number of retransmissions allowed for a packet. The maximum number of retransmissions may be based on the QoS requirements, and be configured per service type.

$T_{Delivery}$: Maximum delivery time allowed for successful delivery of the packet after the first transmission. The maximum delivery time may be based on the QoS requirements, (e.g., a block error rate, latency, or the like), and be configured per service type.

$T_{RecoverySync}$: For synchronous H-ARQ, a time within which the H-ARQ receiver expects to receive a failed packet after transmitting an H-ARQ error indicator.

$T_{RecoveryAsync}$: For asynchronous H-ARQ, a time within which the H-ARQ receiver expects to receive a failed packet after transmitting an H-ARQ error indicator. The timer may be associated with the QoS requirements, and be configured per service type. For example, the length of the timer may be linked to the scheduling priority.

$W_{HARQ}$: A window, (i.e., the number of packets), within which a failed packet should be received. If the failed packet is not received within $W_{HARQ}$, it is assumed lost.

The transmitter 310 and the receiver 320 may also be given with a parameter for a lifespan of a packet, (i.e., the maximum time to transmit the packet). The parameters may be provided by a central node to the H-ARQ receiver 324 and the H-ARQ transmitter 314. If the parameters are defined per service type, the parameters may be given to the H-ARQ receiver 324 and the H-ARQ transmitter 314 at the start of that service.

The maximum number of retransmissions and/or the lifespan of a packet may be dynamically changed depending on the QoS requirements. The maximum number of transmissions may be indicated by either explicitly identifying the number of transmissions in the associated signaling or identifying a MAC flow that is associated with a configured maximum number of transmissions. In accordance with the first option, the number of retransmissions per packet is indicated in the associated control signaling for the first transmission. In accordance with the second option, each MAC flow may be associated with a certain number of retransmissions and by identifying the MAC flow in the associated control signaling for the first transmission, the maximum number of transmissions may be indicated. If the second option is used, the identified MAC flow is translated to the maximum number of transmissions configured by the receiver. The maximum number of retransmissions may also be known by an H-ARQ process ID if specific H-ARQ processes are dedicated to a MAC flow for a set of MAC flows. Alternatively, a flag may be set in the associated signaling to indicate last transmission.

A process 400 for implementing an H-ARQ-assisted ARQ operation in accordance with the present invention is explained hereafter with reference to FIG. 3. The H-ARQ transmitter 314 transmits a packet to the H-ARQ receiver 324 (step 402). If the packet is successfully received, the H-ARQ receiver 324 sends the packet to the ARQ receiver 322 (not shown in FIG. 3). If the packet is not successfully received, the H-ARQ receiver 324 sends a NACK to the H-ARQ transmitter 314 (step 404). After sending the NACK in step 404, the H-ARQ receiver 324 determines whether an H-ARQ NACK-to-ACK error occurs (step 406). Upon detection of the H-ARQ NACK-to-ACK error, the H-ARQ receiver 324 generates, and sends, an H-ARQ NACK-to-ACK error indicator to the H-ARQ transmitter 314 (step 408).

For synchronous H-ARQ transmission, the time of a H-ARQ retransmission is known to the receiver. If the H-ARQ receiver 324 receives a new packet when expecting retransmission of the failed packet, the H-ARQ receiver 324 determines that an H-ARQ NACK-to-ACK error occurs and sends an H-ARQ NACK-to-ACK error indicator unless the failed packet has been transmitted for the maximum number of retransmissions.

For asynchronous H-ARQ transmission, a timer $T_{ErrorIndicator}$ is set at the H-ARQ receiver 324 when the maximum number of retransmission has not been reached and the H-ARQ receiver 324 sends a NACK to the H-ARQ transmitter 314 at step 404. If the failed packet is successfully received before the timer $T_{ErrorIndicator}$ expires, the timer $T_{ErrorIndicator}$ is reset to zero and the H-ARQ NACK-to-ACK error indicator is not generated. If the H-ARQ receiver 324 does not successfully receive the failed packet before the timer $T_{ErrorIndicator}$ expires, the H-ARQ receiver 324 determines that an H-ARQ NACK-to-ACK error occurs and sends an H-ARQ NACK-to-ACK error indicator to the H-ARQ transmitter 314 unless the number of transmissions of the failed packet has reached the maximum retransmission limit, the maximum delivery time for the packet, ($T_{Delivery}$), has expired, and/or the lifespan of the failed packet has expired.

The H-ARQ NACK-to-ACK error indicator is sent from the H-ARQ receiver 324 to the H-ARQ transmitter 314 to inform about a NACK-to-ACK misinterpretation at the H-ARQ transmitter 314. The H-ARQ NACK-to-ACK error indicator is associated with a particular H-ARQ process and a particular packet in the H-ARQ process. The H-ARQ NACK-to-ACK error indicator contains H-ARQ process identity (ID) and a TSN to identify the packet ID in the H-ARQ process.

For synchronous H-ARQ, the H-ARQ process ID and the TSN may be removed since a fixed timing relationship between the failed transmission and the error report can be used to associate the H-ARQ NACK-to-ACK error indicator with an H-ARQ process ID and a packet TSN. For example, if there are four (4) synchronous H-ARQ processes, the H-ARQ NACK-to-ACK error indicator may be sent after time t of receiving the packet with a TSN n for which the NACK-to-ACK error happened.

An H-ARQ NACK-to-ACK error indicator packet may be independent of the H-ARQ operation. This is achieved by sending the process identity (if needed) and time offset to identify reception time of the received error. Alternatively, the H-ARQ NACK-to-ACK error indicator may be sent as a physical layer signal at a fixed time offset after the reception of the received error packet.

If more than one packet may be sent simultaneously from the transmitter 310 to the receiver 320, the packets have their own cyclic redundancy check (CRC) and one H-ARQ NACK-to-ACK error indicator may be used to send NACK-to-ACK error indications for several packets. Hence, the H-ARQ NACK-to-ACK error indicator may contain multiple H-ARQ process IDs, associated packet TSNs and/or timing offset.

The H-ARQ NACK-to-ACK error indicator may have its own CRC to ensure reliable transmission. This allows MAC or RLC layer signaling for H-ARQ NACK-to-ACK error indication. The H-ARQ NACK-to-ACK error indicator packet may be created either at H-ARQ or ARQ level.

Still referring to FIG. 3, to ensure receipt of the H-ARQ NACK-to-ACK error indicator, the H-ARQ transmitter 314 may send an ACK to the H-ARQ receiver 324 (step 410). The H-ARQ receiver 324 may repeatedly send the H-ARQ NACK-to-ACK error indicator until the H-ARQ receiver 324 receives an ACK from the H-ARQ transmitter 314 or radio link fails.

After receiving the H-ARQ NACK-to-ACK error indicator at step 408, the H-ARQ transmitter 314 tries to recover the error at an H-ARQ level by retransmitting the failed packet unless the maximum retransmission limit has reached, the maximum delivery time has expired, and/or the lifespan of the failed packet has expired (step 412). The H-ARQ transmitter 314 may send a local NACK to the ARQ transmitter 312 so that the failed packet can be recovered at an ARQ level (step 414). Preferably, the H-ARQ transmitter 314 sends the local NACK to the ARQ transmitter 312 only if the maximum number of retransmissions has been reached, the maximum delivery time for transmission of the failed packet has expired, or the lifespan of the failed packet has expired.

In the prior art, upon successful delivery of a packet, the H-ARQ receiver 324 sends an ACK to the H-ARQ transmitter 314 and the H-ARQ transmitter 314 sends a local ACK to the ARQ transmitter 312. In accordance with the present invention, the H-ARQ transmitter 314 may or may not send a local ACK to the ARQ transmitter 312 in such situation.

After sending the H-ARQ NACK-to-ACK error indicator at step 408, the H-ARQ receiver 324 determines at step 416 whether the H-ARQ receiver 324 does not receive the failed packet successfully before at least one of the following conditions:

1) expiration of $T_{RecoverySync}$ (for synchronous H-ARQ transmission) or $T_{RecoveryAsync}$ (for asynchronous H-ARQ transmission);
2) receipt of a new H-ARQ packet with a sequence number which is higher than the sequence number of the failed packet by $W_{HARQ}$;
3) reaching the maximum number of retransmissions of the failed packet;
4) expiration of the timer $T_{Delivery}$; and
5) expiration of the lifespan of the failed packet.

If at least one of the foregoing conditions occurs, the H-ARQ receiver 324 sends a local NACK to the ARQ receiver 322 (step 418). Upon reception of the local NACK, the ARQ receiver 322 may send a status report to the ARQ transmitter 312 to recover the failed packet (step 420). The mapping between an ARQ PDU and an H-ARQ PDU is not relevant as long as the H-ARQ receiver 324 is able to identify the ARQ PDU that needs to be recovered.

The ARQ buffer at the ARQ transmitter 312 may be emptied after receiving the status report from the ARQ receiver 322. The status report for the failed packet contains the information about successfully received packets. Alternatively, the ARQ receiver 322 may send a status report after receiving N consecutive packets successfully or expiration of a timer. Alternatively, the ARQ transmitter 312 may poll the ARQ receiver 322 after transmitting the last packet in the buffer. The reason for polling is to recover early from the NACK-to-ACK error at an H-ARQ level for the last packet. Setting the "Poll bit for the last packet" is a configurable parameter for a data flow.

In order to improve the recovery of the last packet in H-ARQ transmissions, a special small packet with a last packet indication may be sent from the H-ARQ transmitter 314 after the H-ARQ buffer is empty. The transmission of the special packet with a last packet indication ensures early recovery of the loss of the last packet at the H-ARQ level. The H-ARQ receiver 324 sends a response back to the H-ARQ transmitter 314 upon receiving the special packet. The response packet may be a new packet generated at an H-ARQ level indicating the last TSN received. Alternatively, the response packet may be sent by using an H-ARQ error indication packet indicating that it is a response to the small packet.

Alternatively, in order to reduce the signaling overhead, a null transmission may be sent after the last data packet in an H-ARQ transmission queue to invoke the ACK check on the previous transmission. A null packet only includes control information (i.e., no payload). The H-ARQ transmitter 314 transmits the null packet after reception of an H-ARQ ACK for the last data packet in the H-ARQ transmission queue. Once the H-ARQ receiver 324 receives a null packet, the H-ARQ receiver 324 confirms reception of the last data packet as well as the null packet. If, at the H-ARQ receiver, the last packet was not successfully received and therefore a NACK was sent in response to the last packet and the maximum number of transmissions was not reached, the reception of the null packet will allow the H-ARQ receiver 324 to detect the NACK-to-ACK error.

The transmitter 310 and the receiver 320 may be a WTRU, a base station or any other network entity in a WCDMA, CDMA2000 or long term evolution (LTE) of a third generation (3G) system. "WTRU" includes but is not limited to a user equipment (UE), a mobile station, a fixed or mobile subscriber unit, a pager, a cellular telephone, a personal data assistant (PDA), a computer, or any other type of user device capable of operating in a wireless environment. "Base station" includes but is not limited to a Node-B, a site controller, an access point or any other type of interfacing device in a wireless environment.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for implementing hybrid automatic repeat request (H-ARQ)-assisted automatic repeat request (ARQ), the method comprising:

determining that an H-ARQ negative acknowledgement (NACK)-to-positive acknowledgement (ACK) error has occurred with respect to a failed packet, wherein more than one packet is transmitted simultaneously and the H-ARQ NACK-to-ACK error indicator indicates H-ARQ NACK-to-ACK errors of more than one packet;

determining whether or not to transmit an H-ARQ NACK-to-ACK error indicator, wherein the H-ARQ NACK-to-ACK error indicator is not transmitted on a condition that any of the number of retransmissions of the failed packet has reached a maximum retransmission limit, a maximum time for delivery of the failed packet has expired, or a lifespan of the failed packet has expired; and determining whether or not to transmit a local NACK.

2. The method of claim 1 wherein the H-ARQ NACK-to-ACK error indicator is associated with an H-ARQ process identity (ID) and the failed packet.

3. The method of claim 2 wherein the H-ARQ NACK-to-ACK error indicator includes the H-ARQ process ID and a transmission sequence number of the failed packet.

4. The method of claim 2 wherein the H-ARQ NACK-to-ACK error indicator is transmitted with a fixed timing offset with respect to transmission of the failed packet.

5. The method of claim 1 wherein transmission of the H-ARQ NACK-to-ACK error indicator and transmission of the failed packet are independent.

6. The method of claim 1 wherein the H-ARQ NACK-to-ACK error indicator is transmitted via at least one of physical layer signaling, a medium access control (MAC) layer signaling and a radio link control (RLC) layer signaling.

7. The method of claim 1 wherein the H-ARQ NACK-to-ACK error indicator is transmitted along with a cyclic redundancy check (CRC).

8. The method of claim 1 wherein it is determined not to transmit a local NACK on a condition that the failed packet is not received before expiration of a recovery timer which is set when the NACK-to-ACK indicator is transmitted.

9. The method of claim 1 wherein it is determined not to transmit a local NACK on a condition that the failed packet is not received until after a packet with a sequence number higher than a sequence number of the failed packet by a predetermined number is received.

10. The method of claim 1 wherein it is determined not to transmit a local NACK on a condition that the number of retransmissions of the failed packet reaches a maximum retransmission limit for the failed packet.

11. The method of claim 1 wherein it is determined not to transmit a local NACK on a condition that the failed packet is not received until after a maximum time for delivery of the failed packet expires.

12. A method for implementing hybrid automatic repeat request (H-ARQ)-assisted automatic repeat request (ARQ), the method comprising:

determining that an H-ARQ negative acknowledgement (NACK)-to-positive acknowledgement (ACK) error has occurred with respect to a failed packet;

determining whether or not to transmit an H-ARQ NACK-to-ACK error indicator, wherein the H-ARQ NACK-to-ACK error indicator is not transmitted on a condition that any of the number of retransmissions of the failed packet has reached a maximum retransmission limit, a maximum time for delivery of the failed packet has expired, or a lifespan of the failed packet has expired; and determining not to transmit a local NACK on a condition that the failed packet is not received until after a packet with a sequence number higher than a sequence number of the failed packet by a predetermined number is received.

13. The method of claim 12 wherein the H-ARQ NACK-to-ACK error indicator is associated with an H-ARQ process identity (ID) and the failed packet.

14. The method of claim 13 wherein the H-ARQ NACK-to-ACK error indicator includes the H-ARQ process ID and a transmission sequence number of the failed packet.

15. The method of claim 13 wherein the H-ARQ NACK-to-ACK error indicator is transmitted with a fixed timing offset with respect to transmission of the failed packet.

16. The method of claim 12 wherein transmission of the H-ARQ NACK-to-ACK error indicator and transmission of the failed packet are independent.

17. The method of claim 12 wherein the H-ARQ NACK-to-ACK error indicator is transmitted via at least one of physical layer signaling, a medium access control (MAC) layer signaling and a radio link control (RLC) layer signaling.

18. The method of claim 12 wherein more than one packet is transmitted simultaneously and the H-ARQ NACK-to-ACK error indicator indicates H-ARQ NACK-to-ACK errors of more than one packet.

19. The method of claim 12 wherein the H-ARQ NACK-to-ACK error indicator is transmitted along with a cyclic redundancy check (CRC).

20. The method of claim 12 further comprising determining not to transmit a local NACK on a condition that the failed packet is not received before expiration of a recovery timer which is set when the NACK-to-ACK indicator is transmitted.

21. The method of claim 12 further comprising determining not to transmit a local NACK on a condition that the number of retransmissions of the failed packet reaches a maximum retransmission limit for the failed packet.

22. The method of claim 12 further comprising determining not to transmit a local NACK on a condition that the failed packet is not received until after a maximum time for delivery of the failed packet expires.

23. A hybrid automatic repeat request (H-ARQ) receiver for implementing an H-ARQ-assisted automatic repeat request (ARQ), the receiver being configured to:
determine that an H-ARQ negative acknowledgement (NACK)-to-positive acknowledgement (ACK) error has occurred with respect to a failed packet, wherein more than one packet is transmitted simultaneously and the H-ARQ NACK-to-ACK error indicator indicates H-ARQ NACK-to-ACK errors of more than one packet;
determine whether or not to transmit an H-ARQ NACK-to-ACK error indicator, wherein the H-ARQ NACK-to-ACK error indicator is not transmitted on a condition that any of
the number of retransmissions of the failed packet has reached a maximum retransmission limit,
a maximum time for delivery of the failed packet has expired, or
a lifespan of the failed packet has expired; and
determining whether or not to transmit a local NACK.

24. The receiver of claim 23 wherein the H-ARQ NACK-to-ACK error indicator is associated with an H-ARQ process identity (ID) and the failed packet.

25. The receiver of claim 24 wherein the H-ARQ NACK-to-ACK error indicator includes the H-ARQ process ID and a transmission sequence number of the failed packet.

26. The receiver of claim 24 wherein the H-ARQ NACK-to-ACK error indicator is transmitted with a fixed timing offset with respect to transmission of the failed packet.

27. The receiver of claim 23 wherein transmission of the HARQ NACK-to-ACK error indicator and transmission of the failed packet are independent.

28. The receiver of claim 23 wherein the H-ARQ NACK-to-ACK error indicator is transmitted via at least one of physical layer signaling, a medium access control (MAC) layer signaling and a radio link control (RLC) layer signaling.

29. The receiver of claim 23 wherein the H-ARQ NACK-to-ACK error indicator is transmitted along with a cyclic redundancy check (CRC).

30. The receiver of claim 23 wherein it is determined not to transmit a local NACK on a condition that the failed packet is not received before expiration of a recovery timer which is set when the NACK-to-ACK indicator is transmitted.

31. The receiver of claim 23 wherein it is determined not to transmit a local NACK on a condition that the failed packet is not received until after a packet with a sequence number higher than a sequence number of the failed packet by a predetermined number is received.

32. The receiver of claim 23 wherein it is determined not to transmit a local NACK on a condition that the number of retransmissions of the failed packet reaches a maximum retransmission limit for the failed packet.

33. The receiver of claim 23 wherein it is determined not to transmit a local NACK on a condition that the failed packet is not received until after a maximum time for delivery of the failed packet expires.

34. A hybrid automatic repeat request (H-ARQ) receiver for implementing an H-ARQ-assisted automatic repeat request (ARQ), the receiver being configured to:
determine that an H-ARQ negative acknowledgement (NACK)-to-positive acknowledgement (ACK) error has occurred with respect to a failed packet;
determine whether or not to transmit an H-ARQ NACK-to-ACK error indicator, wherein the H-ARQ NACK-to-ACK error indicator is not transmitted on a condition that any of
the number of retransmissions of the failed packet has reached a maximum retransmission limit,
a maximum time for delivery of the failed packet has expired, or
a lifespan of the failed packet has expired; and
determining not to transmit a local NACK on a condition that the failed packet is not received until after a packet with a sequence number higher than a sequence number of the failed packet by a predetermined number is received.

35. The receiver of claim 34 wherein the H-ARQ NACK-to-ACK error indicator is associated with an H-ARQ process identity (ID) and the failed packet.

36. The receiver of claim 35 wherein the H-ARQ NACK-to-ACK error indicator includes the H-ARQ process ID and a transmission sequence number of the failed packet.

37. The receiver of claim 35 wherein the H-ARQ NACK-to-ACK error indicator is transmitted with a fixed timing offset with respect to transmission of the failed packet.

38. The receiver of claim 34 wherein transmission of the HARQ NACK-to-ACK error indicator and transmission of the failed packet are independent.

39. The receiver of claim 34 wherein the H-ARQ NACK-to-ACK error indicator is transmitted via at least one of physical layer signaling, a medium access control (MAC) layer signaling and a radio link control (RLC) layer signaling.

40. The receiver of claim 34 wherein more than one packet is transmitted simultaneously and the H-ARQ NACK-to-ACK error indicator indicates H-ARQ NACK-to-ACK errors of more than one packet.

41. The receiver of claim 34 wherein the H-ARQ NACK-to-ACK error indicator is transmitted along with a cyclic redundancy check (CRC).

42. The receiver of claim 34 wherein it is determined not to transmit a local NACK on a condition that the failed packet is not received before expiration of a recovery timer which is set when the NACK-to-ACK indicator is transmitted.

43. The receiver of claim 34 wherein it is determined not to transmit a local NACK on a condition that the number of retransmissions of the failed packet reaches a maximum retransmission limit for the failed packet.

44. The method of claim 34 wherein it is determined not to transmit a local NACK on a condition that the failed packet is not received until after a maximum time for delivery of the failed packet expires.

\* \* \* \* \*